United States Patent
He

(10) Patent No.: US 9,554,301 B2
(45) Date of Patent: Jan. 24, 2017

(54) SHUNTING METHOD AND SYSTEM FOR MULTI-NETWORK JOINT TRANSMISSION, AND ACCESS NETWORK ELEMENT

(71) Applicant: ZTE Corporation, Shenzhen, Guangdong (NC)

(72) Inventor: Feng He, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 134 days.

(21) Appl. No.: 14/427,834

(22) PCT Filed: Sep. 17, 2013

(86) PCT No.: PCT/CN2013/083694
§ 371 (c)(1),
(2) Date: Mar. 12, 2015

(87) PCT Pub. No.: WO2014/040574
PCT Pub. Date: Mar. 20, 2014

(65) Prior Publication Data
US 2015/0215809 A1    Jul. 30, 2015

(30) Foreign Application Priority Data
Sep. 17, 2012  (CN) .......................... 2012 1 0344281

(51) Int. Cl.
*H04W 4/00*       (2009.01)
*H04W 28/02*      (2009.01)
(Continued)

(52) U.S. Cl.
CPC ...... *H04W 28/0226* (2013.01); *H04L 61/2038* (2013.01); *H04W 48/18* (2013.01);
(Continued)

(58) Field of Classification Search
None
See application file for complete search history.

(56) References Cited

U.S. PATENT DOCUMENTS

| | | | |
|---|---|---|---|
| 7,116,970 | B2 | 10/2006 | Brusilovsky |
| 2004/0203732 | A1 | 10/2004 | Brusilovsky |

(Continued)

FOREIGN PATENT DOCUMENTS

| | | |
|---|---|---|
| CN | 101730279 A | 6/2010 |
| CN | 102480528 A | 5/2012 |

(Continued)

OTHER PUBLICATIONS

International Search Report in international application No. PCT/CN2013/083694, mailed on Nov. 28, 2013.

(Continued)

*Primary Examiner* — Phirin Sam
(74) *Attorney, Agent, or Firm* — Oppedahl Patent Law Firm LLC

(57) ABSTRACT

A shunting method and system for multi-network joint transmission and an access network element are provided, and the method includes that a network element of a 3GPP access network transmits a shunting request message to a network element of a WLAN access network; upon reception of a success response from the network element of the WLAN access network, the network element of the 3GPP access network transmits to a UE a shunting command to indicate the UE to access a target WLAN access network corresponding to the network element of the WLAN access network; and after determining that the UE has successfully accessed the target WLAN access network, the network element of the 3GPP access network performs data shunting transmission through a shunting connection between the network element of the 3GPP access network and the network element of the WLAN access network. By means of (Continued)

the disclosure, it is possible to implement shunting control over multi-network joint transmission by a network side.

21 Claims, 4 Drawing Sheets

(51) Int. Cl.
- *H04W 48/18* (2009.01)
- *H04L 29/12* (2006.01)
- *H04W 8/26* (2009.01)
- *H04W 84/12* (2009.01)
- *H04W 88/10* (2009.01)

(52) U.S. Cl.
CPC .............. *H04W 8/26* (2013.01); *H04W 84/12* (2013.01); *H04W 88/10* (2013.01)

(56) References Cited

U.S. PATENT DOCUMENTS

| | | | |
|---|---|---|---|
| 2011/0222523 A1 | 9/2011 | Fu et al. | |
| 2013/0088983 A1* | 4/2013 | Pragada | H04W 16/14 370/252 |
| 2015/0043486 A1* | 2/2015 | Ozturk | H04W 76/026 370/329 |

FOREIGN PATENT DOCUMENTS

| | | |
|---|---|---|
| JP | 2013521724 A | 6/2013 |
| JP | 2015534354 A | 11/2015 |
| WO | 2011109798 A2 | 9/2011 |
| WO | 2014043494 A1 | 3/2014 |

OTHER PUBLICATIONS

English Translation of the Written Opinion of the International Search Authority in international application No. PCT/CN2013/083694, mailed on Nov. 28, 2013.

"3rd Generation Partnership Project; Technical Specification Group Services and System Aspects; 36PP system to Wireless Local Area Network (WLAN) interworking; System description (Release 10)", 3GPP Standard; 3GPP TS 23.234, 3rd Generation Partnership Project (3GPP), Mobile Competence Centre; 650, Route des Lucioles; F-06921 Sophia-Antipolis Cedex • France No. V10.6.0, Mar. 29, 2011 (Mar. 29, 2011), pp. 1-84, XP050476487,[retrieved on Mar. 29, 2011]mailed on Mar. 29, 2011.

Tansir Ahmed et al: "Multi Access Data Network Connectivity and IP Flow Mobility in Evolved Packet System (EPS)", Wireless Communications and Networking Conference (WCNC), 2010 IEEE, IEEE, Piscataway, NJ, USA, Apr. 18, 2010 (Apr. 18, 2010), pp. 1-6, XP031706546, mailed on Apr. 18, 2010.

Janne Tervonen: "Deliverable DA2.2.22 Offloading Traffic from Cellular Networks with PBRM",Internet Citation,Jun. 30, 2010 (Jun. 30, 2010), pp. 1-39, XPG07919591,Retrieved from the Internet:URL:www.futureinternet.fi [retrieved on Oct. 19, 2011],mailed on Jun. 30, 2010.

Supplementary European Search Report in European application No. 13836484.9, mailed on Jun. 13, 2016.

* cited by examiner

SHUNTING METHOD AND SYSTEM FOR MULTI-NETWORK JOINT TRANSMISSION, AND ACCESS NETWORK ELEMENT

RELATED APPLICATIONS

This application is a 35 U.S.C. 371 national stage filing from International Application No. PCT/CN2013/083694, filed Sep. 17, 2013, and claims priority to Chinese Application No. 20120344281.3, filed Sep. 17, 2012, the teachings of which are incorporated herein by reference.

TECHNICAL FIELD

The disclosure relates to the field of mobile communications, and in particular to a shunting method and system for multi-network joint transmission, and an access network element.

BACKGROUND

With the evolution of wireless communication techniques and protocol standards, mobile packet services have experienced great development, and data throughput of an individual terminal has been increasingly improved. Taking a Long Term Evolution (LTE) system as an example, a bandwidth of 20 M can support data transmission at a maximum downlink rate of 100 Mbps. In an LTE Advanced (LTE-A) system, the data transmission rate is further improved even up to 1 Gbps.

An explosive increase in an amount of data services for a terminal makes existing network resources incapable of meeting demands, which is especially a big problem when new generation communication techniques (for example 3G, LTE) cannot be widely applied to networking, thus it is not possible to meet requirements on rate and traffic desired by a user, thereby resulting in poor user experiences. How to prevent and change this situation is a problem that operators have to consider, on one hand, it is necessary to expedite promotion of new techniques and network deployment; on the other hand, it is desired to accomplish a rapid improvement on network performance through enhancement of existing networks and techniques. It is well known that besides wireless network techniques provided by the 3rd Generation Partnership Project (3GPP), currently used wireless local area networks, especially wireless local area networks based on IEEE 802.11 standards are widely applied to hotspot access coverage in the field of homes, enterprises or even the Internet. Technical specifications proposed by the WiFi Alliance have the widest application.

On the above premise, the present operators have proposed joint transmission based on Wireless Local Area Networks (WLANs) and existing 3GPP networks, i.e., using WLANs to accomplish offload of existing LTE networks and improvement on network performance. At present, the 3GPP has already established relevant protocols for interworking between 3GPP networks and WLANs; as shown in FIG. 1, an existing interworking architecture enables a WLAN network to use an Authentication Authorization Accounting (AAA) server in an LTE network to perform integrated authentication and authorization, and to multiplex a Packet Data Network Gateway (P-GW) in the LTE network to take it as a P-GW of the WLAN, and the existing interworking architecture can also implement integrated accounting and charging of both networks, thereby accomplishing loose coupling between both networks.

However, the current interworking architecture has disadvantages below:

1. the existing interworking architecture depends on the fact that an operator should have an independent 3GPP network and an independent and whole WLAN network, this requires the operator to operate and maintain multiple networks simultaneously, thus leading to higher capital expenditure;

2. a User Equipment (UE) cannot learn whether the network side (e.g., an LTE network and a WLAN network) supports interworking, thus the UE may be connected to a target network that cannot interwork with a current network;

3. switching of data streams is slow when a UE moves between a 3GPP network and a WLAN network; and 4. since existing interworking is triggered by a UE, the network side has no initiative for selecting a target network, thus losing control over a network that the UE accesses, thereby incapable of directing a user to access desired target network or an optimum target network.

SUMMARY

In view of the above, the embodiments of the disclosure provide a shunting method and system for multi-network joint transmission, and an access network element, so as to implement shunting control over multi-network joint transmission by the network side.

To this end, the technical solutions of embodiments of the disclosure are implemented as follows.

A shunting method for multi-network joint transmission, including that: a network element of a 3rd Generation Partnership Project (3GPP) access network transmits a shunting request message to a network element of a Wireless Local Area Network (WLAN) access network; upon receiving a success response from the network element of the WLAN access network, the network element of the 3GPP access network transmits a shunting command to a User Equipment (UE) to indicate the UE to access a target WLAN access network corresponding to the network element of the WLAN access network; and after determining that the UE has successfully accessed the target WLAN access network, the network element of the 3GPP access network performs data shunting transmission through a shunting connection between the network element of the 3GPP access network and the network element of the WLAN access network.

The shunting request message may contain shunting configuration information that includes identification information of the UE and at least one of following contents: an address and a port number of the shunting connection of the network element of the 3GPP access network, and format information of a shunted data stream.

The success response may contain shunting preparation information that includes identification information of the UE and at least one of following contents: a WLAN association identifier, address information allocated by the network element of the WLAN access network to the UE, and an address and a port number of the shunting connection of the network element of the WLAN access network.

The shunting command may contain shunting indication information that includes at least one of following contents: a WLAN association identifier, address information allocated by the network element of the WLAN access network to the UE, and identification information of the WLAN access network.

The network element of the 3GPP access network may determine whether the UE has successfully accessed the target WLAN access network according to an indication message from the UE or from the network element of the WLAN access network.

The step that the network element of the 3GPP access network performs data shunting transmission through the shunting connection between the network element of the 3GPP access network and the network element of the WLAN access network may include: the network element of the 3GPP access network transmits downlink shunted data to the network element of the WLAN access network through the shunting connection between the network element of the 3GPP access network and the network element of the WLAN access network so that the network element of the WLAN access network transmits the downlink shunted data to the UE, and the network element of the 3GPP access network receives uplink shunted data transmitted by the UE to the network element of the WLAN access network through the shunting connection between the network element of the 3GPP access network and the network element of the WLAN access network.

In the above solution, when the 3GPP access network is a Long Term Evolution (LTE) network, the network element of the 3GPP access network may be an evolved Node B (eNB), a Relay Node (RN) or a Home evolved Node B (HeNB); and when the 3GPP access network is a Universal Mobile Telecommunications System (UMTS) network, the network element of the 3GPP access network may be a Radio Network Controller (RNC), a Node B or a Home Node B (HNB).

A shunting system for multi-network joint transmission includes a network element of a 3rd Generation Partnership Project (3GPP) access network, a network element of a Wireless Local Area Network (WLAN) access network and a User Equipment (UE), wherein the network element of the 3GPP access network is configured to transmit a shunting request message to the network element of the WLAN access network; upon receiving a success response from the network element of the WLAN access network, transmit a shunting command to the UE to indicate the UE to access a target WLAN access network corresponding to the network element of the WLAN access network; and after determining that the UE has successfully accessed the target WLAN access network, perform data shunting transmission through a shunting connection between the network element of the 3GPP access network and the network element of the WLAN access network;

the network element of the WLAN access network is configured to receive the shunting request message from the network element of the 3GPP access network and return a response to the network element of the 3GPP access network; and further configured to forward shunted data between the UE and the network element of the 3GPP access network through the shunting connection between the network element of the WLAN access network and the network element of the 3GPP access network; and the UE is configured to receive the shunting command from the network element of the 3GPP access network and access, according to the shunting command, the target WLAN access network corresponding to the network element of the WLAN access network; and further configured to, after successfully accessing the target WLAN access network, peform data shunting transmission through the network element of the WLAN access network and the network element of the 3GPP access network.

The shunting request message may contain shunting configuration information that includes identification information of the UE and further includes at least one of following contents: an address and a port number of the shunting connection of the network element of the 3GPP access network, and format information of shunted data stream.

The success response may contain shunting preparation information that includes identification information of the UE and further includes at least one of following contents: a WLAN association identifier, address information allocated by the network element of the WLAN access network to the UE, and an address and a port number of the shunting connection of the network element of the WLAN access network.

The shunting command may contain shunting indication information that includes at least one of following contents: a WLAN association identifier, address information allocated by the network element of the WLAN access network to the UE, and identification information of the WLAN access network.

The network element of the 3GPP access network may be further configured to determine whether the UE has successfully accessed the target WLAN access network according to an indication message from the UE or the network element of the WLAN access network.

The network element of the 3GPP access network may be further configured to transmit downlink shunted data to the network element of the WLAN access network through the shunting connection between the network element of the 3GPP access network and the network element of the WLAN access network so that the network element of the WLAN access network transmits the downlink shunted data to the UE; and configured to receive uplink shunted data transmitted by the UE to the network element of the WLAN access network through the shunting connection between the network element of the 3GPP access network and the network element of the WLAN access network.

In the above solution, when the 3GPP access network is a Long Term Evolution (LTE) network, the network element of the 3GPP access network may be then an evolved Node B (eNB), a Relay Node (RN) or a Home evolved Node B (HeNB); and when the 3GPP access network is a Universal Mobile Telecommunications System (UMTS) network, the network element of the 3GPP access network may be then a Radio Network Controller (RNC), a Node B or a Home Node B (HNB).

A network element of a 3rd Generation Partnership Project (3GPP) access network includes:

a shunting request module configured to transmit a shunting request message to a network element of a Wireless Local Area Network (WLAN) access network and receive a response from the network element of the WLAN access network;

a shunting indication module configured to, upon receiving a success response from the network element of the WLAN access network, transmit a shunting command to a User Equipment (UE) to indicate the UE to access a target WLAN access network corresponding to the network element of the WLAN access network; and a shunting transmission module configured to, after determining that the UE has successfully accessed the target WLAN access network, perform data shunting transmission through a shunting connection between the network element of the 3GPP access network and the network element of the WLAN access network.

The shunting request message may contain shunting configuration information that includes identification information of the UE and further includes at least one of following contents: an address and a port number of the shunting connection of the network element of the 3GPP access network, and format information of a shunted data stream.

The success response may contain shunting preparation information that includes identification information of the UE and further includes at least one of following contents: a WLAN association identifier, address information allocated by the network element of the WLAN access network to the UE, and an address and a port number of the shunting connection of the network element of the WLAN access network.

The shunting command may contain shunting indication information that includes at least one of following contents: a WLAN association identifier, address information allocated by the network element of the WLAN access network to the UE, and identification information of the WLAN access network.

The the shunting transmission module may be further configured to determine whether the UE has successfully accessed the target WLAN access network according to an indication message from the UE or from the network element of the WLAN access network.

The shunting transmission module may be further configured to transmit downlink shunted data to the network element of the WLAN access network through the shunting connection between the network element of the 3GPP access network and the network element of the WLAN access network so that the network element of the WLAN access network transmits the downlink shunted data to the UE; and configured to receive uplink shunted data transmitted by the UE to the network element of the WLAN access network through the shunting connection between the network element of the 3GPP access network and the network element of the WLAN access network.

In the above solution, when the 3GPP access network is a Long Term Evolution (LTE) network, the network element of the 3GPP access network may be an evolved Node B (eNB), a Relay Node (RN) or a Home evolved Node B (HeNB); and when the 3GPP access network is a Universal Mobile Telecommunications System (UMTS) network, the network element of the 3GPP access network may be a Radio Network Controller (RNC), a Node B or a Home Node B (HNB).

In the shunting method and system for multi-network joint transmission and an access network element provided by the embodiments of the disclosure, shunting control over multi-network joint transmission by a 3GPP network side is implemented through establishment of a shunting connection between a network element of a 3GPP access network and a network element of a WLAN access network, and the 3GPP network side can initiatively select a target shunting node for a user and shunt services; the technical solution according to the embodiments of the disclosure can multiplex existing deployed WLAN access points, thus it can save frequency bands and reduce operator's overheads, and when a UE switches between a 3GPP access network and a WLAN access network, the network side controls shunted data transmission, thus enabling a rapid switch of data streams.

DETAILED DESCRIPTION

Technical solutions of the disclosure will be further elaborated below in combination with accompanying drawings and specific embodiments.

Figure 1:
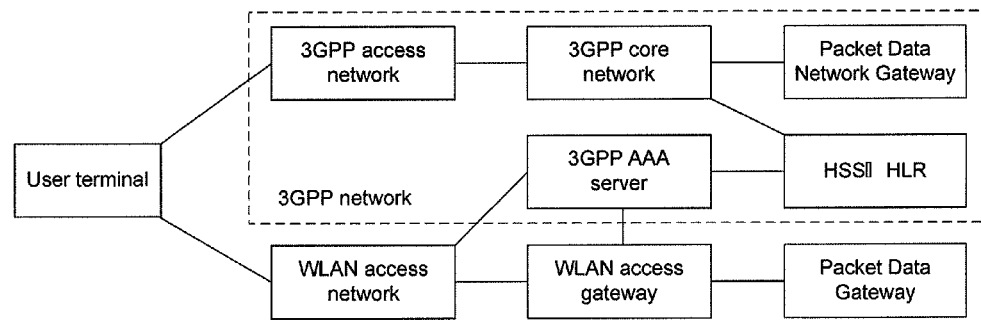
FIG. 1 is a schematic diagram of an existing internetworking architecture.
Figure 2:
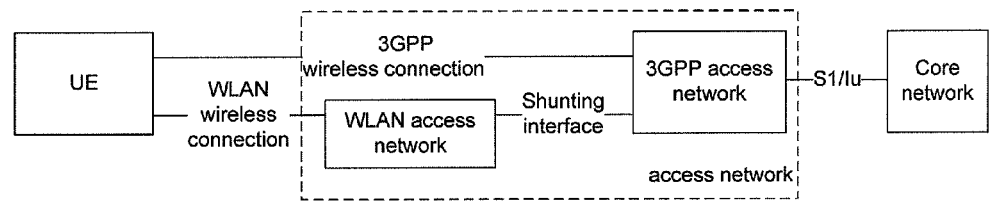
FIG. 2 is a schematic architectural diagram of joint transmission based on a 3GPP network and a WLAN network according to an embodiment of the disclosure.

An embodiment of the disclosure provides an architecture for joint transmission based on a 3GPP network and a WLAN network, as shown in FIG. 2, the architecture includes mainly a core network, an access network and a UE.

Specifically, the core network includes core network elements of a 3GPP system, wherein interfaces between the network elements and the functions are consistent with those in an existing 3GPP network; for example, in an Evolved Packet System (EPS), core network elements include a Mobility Management Entity (MME), a Serving Gateway (S-GW), a Packet Data Network Gateway (P-GW) and the like, while in a Universal Mobile Telecommunications System (UMTS), core network elements include a Serving GPRS Support Node (SGSN), a Gateway GPRS Support Node (GGSN) and the like.

The access network includes a network element of a 3GPP access network and a network element of a WLAN access network.

In an LTE network, the network element of the 3GPP access network may be an evolved Node B (eNB), a Relay Node (RN), a Home eNB (HeNB) or the like; in a UMTS network, the network element of the 3GPP access network may be a Radio Network Controller (RNC), a Node B, a Home Node B (HNB) or the like; besides functions of network elements of an existing 3GPP access network, the network element of the 3GPP access network also has a user data shunting/combination function.

The network element of the WLAN access network includes a WLAN Access Point (AP) and a WLAN Access Control (AC); the WLAN access network functions similarly as an existing WLAN access network, mainly responsible for user data transmission; but the difference between the WLAN access network according to the embodiment of the disclosure and the existing WLAN access network lies in that the data transferred by the WLAN access network are the shunted data transferred by the 3GPP access network through a shunting interface (a transmission interface between the network element of the 3GPP access network and the network element of the WLAN access network).

The UE is a multi-mode terminal equipment which at least supports WLAN and one 3GPP wireless access technique.

In an embodiment, the core network is connected with the network element of the 3GPP access network through an existing network interface, for example connected through an S1 interface in an LTE network, or connected through an Iu interface in a UMTS network.

Figure 3A:
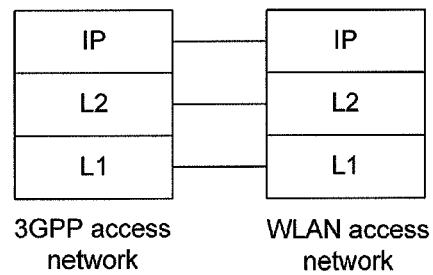
FIG. 3a is a schematic diagram of a protocol stack of a shunting interface for IP layer based transmission between a 3GPP access network and a WLAN access network according to an embodiment of the disclosure.
Figure 3B:
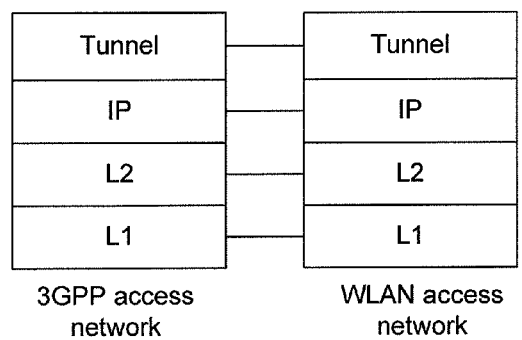
FIG. 3b is a schematic diagram of a protocol stack of a shunting interface for tunnelling layer based transmission between a 3GPP access network and a WLAN access network according to an embodiment of the disclosure.
Figure 3C:
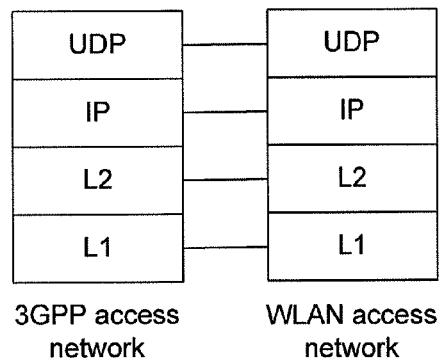
FIG. 3c is a schematic diagram of a protocol stack of a shunting interface for UDP layer based transmission between a 3GPP access network and a WLAN access network according to an embodiment of the disclosure.

In an embodiment, the network element of the 3GPP access network is connected with the network element of the WLAN access network through a wired interface (e.g., optical fiber) or a wireless interface (e.g., a wireless connection based on microwave or 3GPP air interface protocol). The interface is mainly responsible for shunted data transmission between the network element of the 3GPP access network and the network element of the WLAN access network. Data over the interface can be transmitted using an Ethernet transmission protocol, for example an IP layer transmission protocol as shown in FIG. 3a or using a higher layer (for example a tunnelling layer as shown in FIG. 3b and a UDP layer as shown in FIG. 3c) transmission protocol. If a wireless interface is used, the difference from the case when a wired interface is used mainly lies in that bottom layer (i.e., L1, L2) transmission protocols are transmission protocols based on a wireless connection.

In an embodiment, the UE performs data transmission with the network element of the 3GPP access network through a 3GPP air protocol, and performs data transmission with the network element of the WLAN access network through a WLAN air interface protocol.

Figure 4:
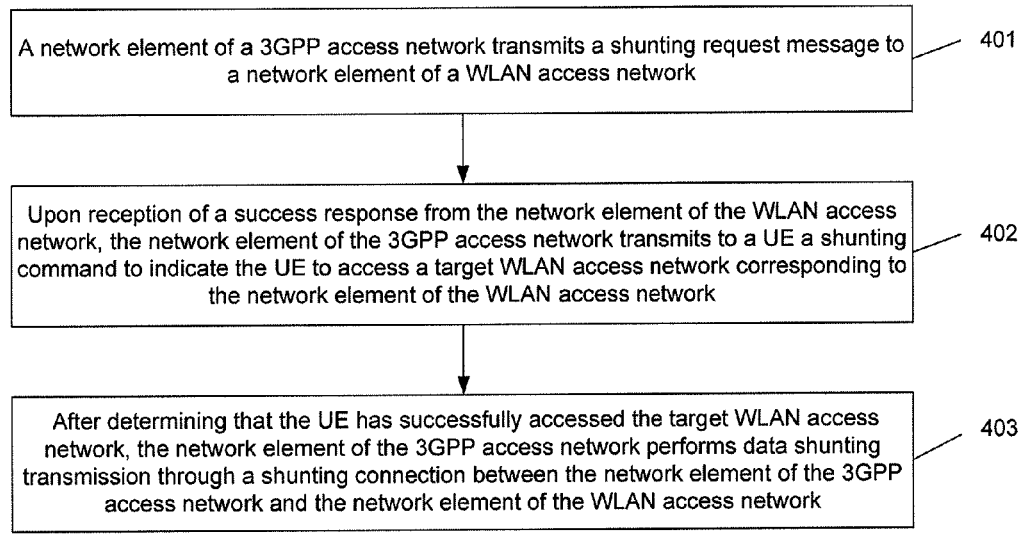
FIG. 4 is a flow chart of a shunting method for multi-network joint transmission according to an embodiment of the disclosure.

Based on the above network architecture, a shunting method for multi-network joint transmission according to an embodiment of the disclosure is as shown in FIG. 4, and the method mainly includes:

step 401 which includes that a network element of a 3GPP access network transmits a shunting request message to a network element of a WLAN access network.

In an embodiment, the shunting request message may contain shunting configuration information that includes identification information of the UE, wherein the identification information of the UE includes identification information allocated to the UE by the 3GPP access network side and/or address information of the UE, wherein the identification information allocated to the UE by the 3GPP access network side may be a Cell Radio Network Temporary Identifier (C-RNTI), and the address information of the UE nay be a Media Access Control (MAC) address or IP address of the UE.

The shunting configuration information includes at least one of following contents:

1. an address and a port number of the shunting connection of the network element of the 3GPP access network; and 2. format information of a shunted data stream, for example indicating that the shunted data are in the form of an IP data packet or a Packet Data Convergence Protocol (PDCP) data packet.

The UE is a UE which is to perform shunted data transmission over the 3GPP access network.

After receiving the shunting request message from the network element of the 3GPP access network, the network element of the WLAN access network may store the shunting configuration information; optionally, the network element of the WLAN access network may prepare for access of the UE, for example allocating address information or the like to the UE.

Step 402 includes that upon reception of a success response from the network element of the WLAN access network, the network element of the 3GPP access network transmits a shunting command to a User Equipment (UE) to indicate the UE to access a target WLAN access network corresponding to the network element of the WLAN access network.

After receiving the shunting request message from the network element of the 3GPP access network, and upon accepting the request, the network element of the WLAN access network returns a success response to the network element of the 3GPP access network, the success response may contain shunting preparation information that includes identification information of the UE, wherein the identification information of the UE includes identification information allocated to the UE by the 3GPP access network side and/or address information of the UE, wherein the identification information allocated to the UE by the 3GPP access network side may be a C-RNTI, and the address information of the UE nay be an MAC address or IP address of the UE.

The shunting preparation information further includes at least one of following contents:

1. a WLAN association identifier, which is identification information of an association established by the UE in the WLAN;

2. address information allocated by the network element of the WLAN access network to the UE, for example a local IP address; and 3. an address and a port number of the shunting connection of the network element of the WLAN access network.

The shunting command contains shunting indication information that includes at least one of following contents:

1. a WLAN association identifier;

2. address information allocated by the network element of the WLAN access network to the UE, for example a local IP address; and 3. identification information of the WLAN access network, for example a Service Set Identifier (SSID), a Basic Service Set Identifier (BSSID) or the like.

After receiving a shunting command from the network element of the 3GPP access network, the UE accesses, according to shunting indication information contained in the shunting command, a target WLAN access network corresponding to the network element of the WLAN access network and establishes a connection.

Step 403 includes that after determining that the UE has successfully accessed the target WLAN access network, the network element of the 3GPP access network performs data shunting transmission through a shunting connection between the network element of the 3GPP access network and the network element of the WLAN access network.

The method for the network element of the 3GPP access network to determine that the UE has successfully accessed the target WLAN access network may include: the UE or the network element of the WLAN access network indicates the network element of the 3GPP access network via a message after the UE has successfully accessed the target WLAN access network. The network element of the 3GPP access network may determine whether the UE has successfully accessed the target WLAN access network according to the indication message from the UE or from the network element of the WLAN access network.

In an embodiment, the step that the network element of the 3GPP access network performs data shunting transmission through a shunting connection between the network element of the 3GPP access network and the network element of the WLAN access network may include:

the network element of the 3GPP access network transmits downlink shunted data to the network element of the WLAN access network through the shunting connection between the network element of the 3GPP access network and the network element of the WLAN access network so that the network element of the WLAN access network transmits the downlink shunted data to the UE; and the network element of the 3GPP access network receives uplink shunted data transmitted by the UE to the network element of the WLAN access network through the shunting connection between the network element of the 3GPP access network and the network element of the WLAN access network.

That is to say, data shunting transmission is performed through the shunting connection between the 3GPP access network and the WLAN access network, specifically, data transmitted between the WLAN access network and the UE are shunted data between the 3GPP access network and the UE; as to downlink, the data are shunted data transmitted from the 3GPP access network to the WLAN access network; as to uplink, the data are shunted data generated from the UE, and after being received by the WLAN access network, the shunted data are required to be transmitted to the 3GPP access network through a shunting interface.

By means of the method described in the above embodiment, the network side can control shunting transmission of data when multiple networks are jointed, wherein the network side may initiatively select a target shunting node for a user and shunt services.

The shunting method for multi-network joint transmission according to the embodiment of the disclosure will be further elaborated below with reference to specific embodiments.

Figure 5:
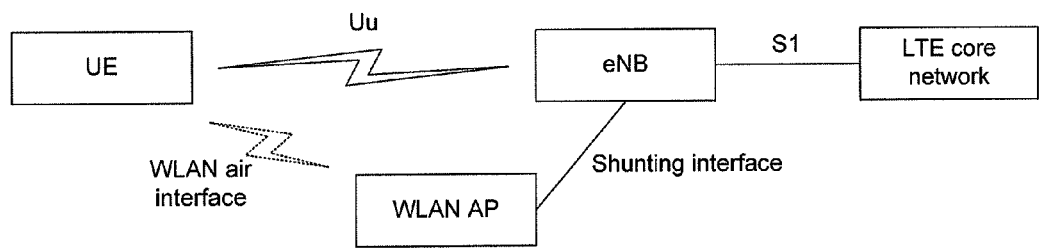
FIG. 5 is a schematic network architectural diagram of joint transmission based on an LTE network and a WLAN network according to an embodiment of the disclosure.
Figure 6:
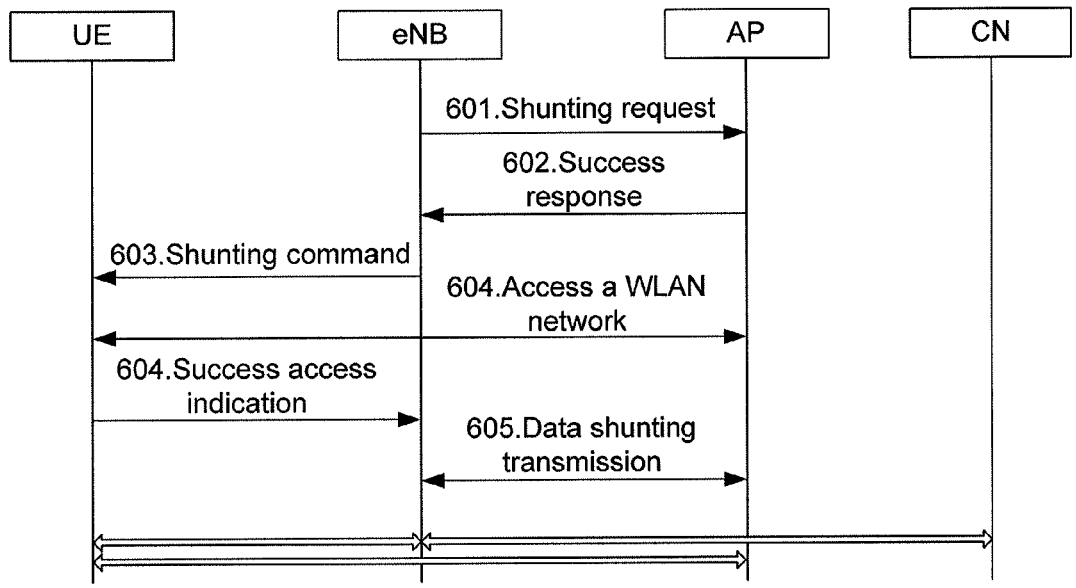
FIG. 6 is a flow chart of a shunting method according to a first embodiment of the disclosure.

In a first embodiment of the disclosure, joint transmission based on an LTE network and a WLAN network is taken as an example, and its network architecture is as shown in FIG. 5, an eNB is connected to an LTE core network through an S1 interface; at a Radio Access Network (RAN) side, the eNB is connected with a WLAN Access Point (AP) through a shunting interface, and the shunting interface is for data exchange based on the Ethernet protocol; the UE performs data transmission between the UE per se and the eNB in accordance with a Uu interface protocol and performs data transmission between the UE per se and the AP in accordance with a WLAN air interface protocol. The shunting method is as shown in FIG. 6, which includes the following steps:

step 601 which includes that an eNB initiates a shunting request message to an AP, the message contains shunting configuration information which includes identification information of a UE (C-RNTI, Cell Radio Network Temporary Identifier), and an address and a port number of a shunting connection at the eNB side;

specifically, selecting by the eNB a shunting node (i.e., AP) may include that the eNB performs selection according to the configuration information or a measurement of the WLAN reported by the UE, for example selecting an AP node having a relatively good radio signal quality during the measurement; here the UE is required to support reporting the measurement to the WLAN.

Step 602 includes that upon receiving the shunting request message, the AP stores the shunting configuration information contained in the shunting request message, allocates an Application Identifier (AID) and a local IP address to the UE, and transmits a success response message containing shunting preparation information to the eNB, wherein the shunting preparation information includes the identification information of the UE (C-RNTI), the local IP address information and the AID of the UE, and an address and a port number of a shunting connection at the WLAN side.

Step 603 includes that upon receiving the success response message, the eNB establishes, according to acquired address information of the shunting connection, a shunting connection between the eNB and the AP, and transmits a shunting command containing shunting indication information to the UE, wherein the shunting indication information includes local IP address information of the UE in the WLAN, and identification information (SSID) of a target WLAN access network.

Step 604 includes that the UE accesses, according to the shunting indication information contained in the shunting command, the target WLAN access network, and notifies the eNB, through an indication message, that the UE has successfully accessed the target WLAN access network.

Step 605 includes that the eNB shunts, through the shunting connection between to the eNB and the AP, part or all of downlink data to the WLAN access network, and transmits the shunted data to the UE via the AP; uplink data of the UE are transmitted to the AP, then the AP transmits the uplink data of the UE to the eNB through the shunting connection between the AP and the eNB.

It should be noted that the architecture shown in FIG. 5 and the procedures shown in FIG. 6 are also applicable to a scenario where the network element of the 3GPP access network is an RN or HeNB, and the differences lie in that a backhaul link in an RN scenario is based on an LTE air interface, and a backhaul link in an HeNB scenario is managed by an HNB gateway. But the network sides act the same when performing selection of a shunting node and corresponding shunting processes, namely, the RN and HeNB implement same functions and operations as the eNB.

Further, the architecture shown in FIG. 5 and the procedures shown in FIG. 6 are also applicable to a scenario where joint transmission is based on a UMTS network and a WLAN network. The difference lies in that the network element of the 3GPP access network is replaced by a network element of a UMTS access network, which includes an RNC and a Node B, thus a shunting connection is established between the RNC and the AP or established between the Node B and the AP, but the entire architecture and shunting method thereof are similar to those in the above embodiment.

Figure 7A:
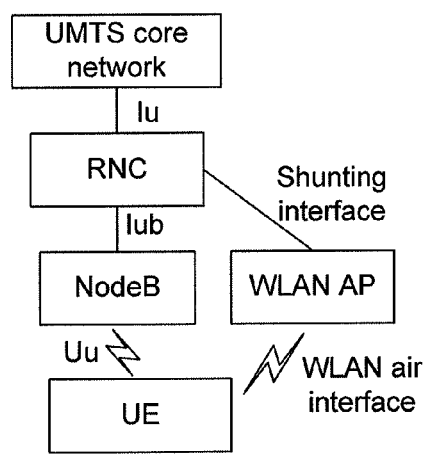
FIG. 7a is a first schematic network architectural diagram of joint transmission based on a UMTS network and a WLAN network according to an embodiment of the disclosure.
Figure 7B:
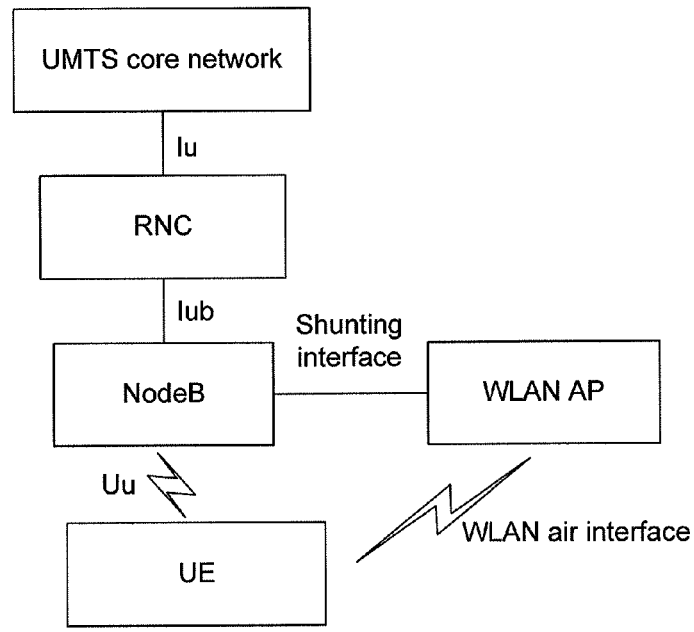
FIG. 7b is a second schematic network architectural diagram of joint transmission based on a UMTS network and a WLAN network according to an embodiment of the disclosure.
Figure 8:
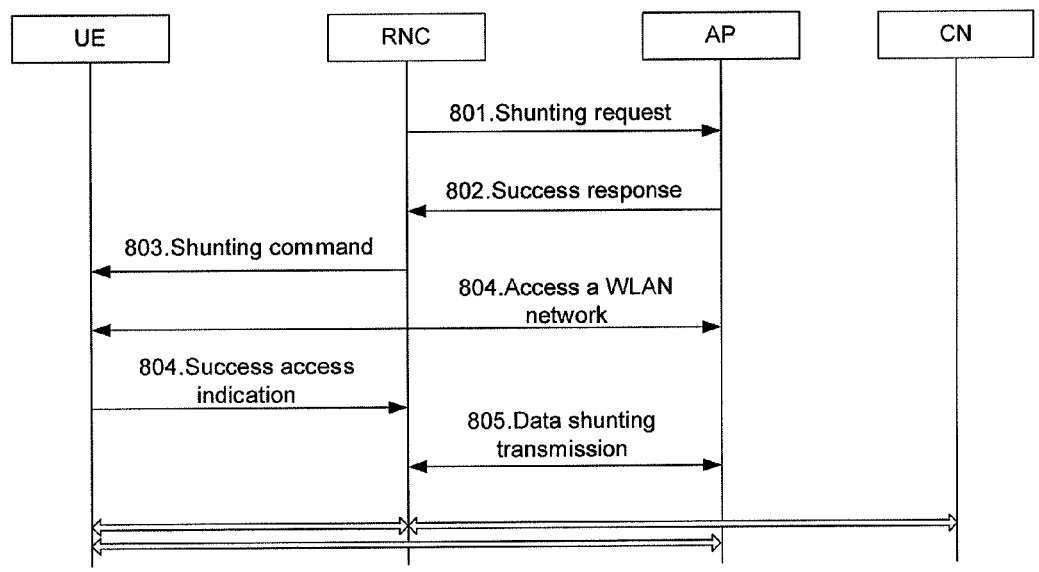
FIG. 8 is a flow chart of a shunting method according to a second embodiment of the disclosure.

In a second embodiment of the disclosure, joint transmission based on a UMTS network and a WLAN network is taken as an example, and its network architecture is as shown in FIG. 7a and FIG. 7b, the shunting connection in FIG. 7a is established between the RNC and the Ap, and the shunting connection in FIG. 7b is established between the Node B and the AP, wherein the shunting interface is for data exchange based on the Ethernet protocol. The shunting method is described by taking the architecture shown in FIG. 7a as an example, wherein in the architecture as shown in FIG. 7a, the RNC is connected to a UMTS core network through an Iu interface, and the UE performs data transmission between the UE per se and the RNC in accordance with a Uu interface protocol and performs data transmission between the UE per se and the AP in accordance with a WLAN air interface protocol. The shunting method is as shown in FIG. 8, which includes the following steps:

step 801 which includes that an RNC initiates a shunting request message to an AP, the message contains shunting configuration information which includes an MAC address of the UE, and an address and a port number of a shunting connection at the RNC side;

wherein a method for the RNC side to acquire the MAC address of the UE may include: the UE indicates the address to the RNC through an uplink message;

specifically, selecting by the RNC a shunting node (i.e., AP) may include: the RNC performs selection according to the configuration information or a measurement report on the WLAN by the UE, for example selecting an AP node having a relatively good radio signal quality in the measurement report by the UE, here the UE is required to support the measurement report on the WLAN.

Step 802 includes that upon receiving the shunting request message, the AP stores the shunting configuration information contained in the shunting request message, and transmits a success response message containing shunting preparation information to the RNC, wherein the shunting preparation information includes an address and a port number of a shunting connection at the WLAN side.

Step 803 includes that upon receiving the success response message, the RNC establishes, according to acquired address information of the shunting connection, a shunting connection between the RNC and the AP, and transmits a shunting command containing shunting indication information to the UE, wherein the shunting indication information includes identification information (SSID) of a target WLAN access network.

Step 804 includes that the UE accesses, according to the shunting indication information contained in the shunting command, the target WLAN access network, and notifies the RNC, through an indication message, that the UE has successfully accessed the target WLAN access network.

Step 805 includes that the RNC shunts, through the shunting connection between the RNC and the AP, part or all of downlink data to the WLAN access network, and transmits the shunted data to the UE via the AP; uplink data of the UE are transmitted to the AP, then the AP transmits the uplink data of the UE to the RNC through the shunting connection between the AP and the RNC.

It should be noted that the shunting method corresponding to the architecture shown in FIG. 7b is similar to the procedures shown in FIG. 8, and the difference lies in that in step 801, the RNC indicates the Node B to initiate the shunting request message to a selected AP, the success response message in step 802 is transmitted to the Node B, the shunting connection in step 803 is established between the Node B and the AP, and in step 805, the Node B performs data shunting transmission through a shunting connection between the Node B and the AP.

It should also be noted that the architectures shown in FIG. 7a, 7b and the procedures shown in FIG. 8 are also applicable to a scenario where the network element of the 3GPP access network is an HNB, and the difference lies in that a backhaul link in the HNB scenario is managed by an HNB gateway. But the network sides all act the same when performing selection of a shunting node and corresponding shunting processes, namely, the HNB implements same functions and operations as the Node B.

Corresponding to the shunting method for multi-network joint transmission according to the embodiment of the disclosure, the disclosure further provides a shunting system for multi-network joint transmission, and the system includes a network element of a 3GPP access network, a network element of a WLAN access network and a UE.

In this embodiment, the network element of the 3GPP access network is configured to transmit a shunting request message to the network element of the WLAN access network; upon receiving a success response from the network element of the WLAN access network, transmit a shunting command to the UE to indicate the UE to access a target WLAN access network corresponding to the network element of the WLAN access network; and after determining that the UE has successfully accessed the target WLAN access network, perform data shunting transmission through a shunting connection between the network element of the 3GPP access network and the network element of the WLAN access network;

the network element of the WLAN access network is configured to receive the shunting request message from the network element of the 3GPP access network and return a response to the network element of the 3GPP access network; and further configured to forward shunted data between the UE and the network element of the 3GPP access network through the shunting connection between the network element of the WLAN access network and the network element of the 3GPP access network; and the UE is configured to receive the shunting command from the network element of the 3GPP access network and access, according to the shunting command, the target WLAN access network corresponding to the network element of the WLAN access network; and further configured to, after accessing successfully the target WLAN access network, peform data shunting transmission through the network element of the WLAN access network and the network element of the 3GPP access network.

In an embodiment, the shunting request message may contain shunting configuration information that includes identification information of the UE and further includes at least one of following contents:

an address and a port number of the shunting connection of the network element of the 3GPP access network, and format information of a shunted data stream.

In an embodiment, the success response may contain shunting preparation information that includes identification information of the UE and further includes at least one of following contents:

a WLAN association identifier, address information allocated by the network element of the WLAN access network to the UE, and an address and a port number of the shunting connection of the network element of the WLAN access network.

In an embodiment, the shunting command may contain shunting indication information that includes at least one of following contents:

a WLAN association identifier, address information allocated by the network element of the WLAN access network to the UE, and identification information of the WLAN access network.

In an embodiment, the network element of the 3GPP access network may be further configured to determine whether the UE has successfully accessed the target WLAN access network according to an indication message from the UE or the network element of the WLAN access network.

In an embodiment, the network element of the 3GPP access network may be further configured to transmit downlink shunted data to the network element of the WLAN access network through the shunting connection between the network element of the 3GPP access network and the network element of the WLAN access network so that the network element of the WLAN access network transmits the downlink shunted data to the UE; and configured to receive uplink shunted data transmitted by the UE to the network element of the WLAN access network through the shunting connection between the network element of the 3GPP access network and the network element of the WLAN access network.

In an embodiment, when the 3GPP access network is a Long Term Evolution (LTE) network, the network element of the 3GPP access network may be an evolved Node B (eNB), a Relay Node (RN) or a Home evolved Node B (HeNB); and when the 3GPP access network is a Universal Mobile Telecommunications System (UMTS) network, the network element of the 3GPP access network may be a Radio Network Controller (RNC), a Node B or a Home Node B (HNB).

An embodiment of the disclosure provides a network element of a 3GPP access network, and the network element of the access network includes:

a shunting request module configured to transmit a shunting request message to a network element of a WLAN access network and receive a response from the network element of the WLAN access network;

a shunting indication module configured to, upon receiving a success response from the network element of the WLAN access network, transmit a shunting command to a UE to indicate the UE to access a target WLAN access network corresponding to the network element of the WLAN access network; and a shunting transmission module configured to, after determining that the UE has successfully accessed the target WLAN access network, perform data shunting transmission through a shunting connection between the network element of the 3GPP access network and the network element of the WLAN access network.

In an embodiment, the the shunting transmission module may be further configured to determine whether the UE has successfully accessed the target WLAN access network according to an indication message from the UE or the network element of the WLAN access network.

In an embodiment, the shunting transmission module may be further configured to transmit downlink shunted data to the network element of the WLAN access network through the shunting connection between the network element of the 3GPP access network and the network element of the WLAN access network so that the network element of the WLAN access network transmits the downlink shunted data to the UE, and receive uplink shunted data transmitted by the UE to the network element of the WLAN access network through the shunting connection between the network element of the 3GPP access network and the network element of the WLAN access network.

In an embodiment, the shunting request module and the shunting indication module may be implemented by a chip having communication functions in the network element of the 3GPP access network; the shunting transmission module can be implemented by a Central Processing Unit, a Micro Processing Unit (MPU) or a Digital Signal Processor (DSP) and a chip having data transmission functions in the network element of the 3GPP access network.

What described are merely embodiments of the disclosure, and are not intended to limit the disclosure.

INDUSTRIAL APPLICABILITY

In the shunting method and system for multi-network joint transmission and an access network element provided by the embodiments of the disclosure, shunting control over multi-network joint transmission by a 3GPP network side is implemented through establishment of a shunting connection between a network element of a 3GPP access network and a network element of a WLAN access network, and the 3GPP network side can initiatively select a target shunting node for a user and shunt services; the technical solution according to the embodiments of the disclosure can multiplex an existing deployed WLAN access point, thus it can save frequency bands and reduce operator's overheads, and when a UE switches between a 3GPP network and a WLAN network, the network side controls transmission of shunted data, thus achieving a rapid switch of data streams.

The invention claimed is:

1. A shunting method for multi-network joint transmission, comprising:
    transmitting, by a network element of a 3rd Generation Partnership Project (3GPP) access network, a shunting request message to a network element of a Wireless Local Area Network (WLAN) access network;
    upon receiving a success response from the network element of the WLAN access network, transmitting, by the network element of the 3GPP access network, a shunting command to a User Equipment (UE) to indicate the UE to access a target WLAN access network corresponding to the network element of the WLAN access network; and
    after determining that the UE has successfully accessed the target WLAN access network, performing, by the network element of the 3GPP access network, data shunting transmission through a shunting connection between the network element of the 3GPP access network and the network element of the WLAN access network.

2. The shunting method for multi-network joint transmission according to claim 1, wherein the shunting request message comprises shunting configuration information that comprises identification information of the UE and further comprises at least one of following contents:
    an address and a port number of the shunting connection of the network element of the 3GPP access network, and format information of a shunted data stream.

3. The shunting method for multi-network joint transmission according to claim 1, wherein the success response comprises shunting preparation information that comprises identification information of the UE and further comprises at least one of following contents:
    a WLAN association identifier, address information allocated by the network element of the WLAN access network to the UE, and an address and a port number of the shunting connection of the network element of the WLAN access network.

4. The shunting method for multi-network joint transmission according to claim 1, wherein the shunting command comprises shunting indication information that comprises at least one of following contents:

a WLAN association identifier, address information allocated by the network element of the WLAN access network to the UE, and identification information of the WLAN access network.

5. The shunting method for multi-network joint transmission according to claim 1, wherein the network element of the 3GPP access network determines whether the UE has successfully accessed the target WLAN access network according to an indication message from the UE or from the network element of the WLAN access network.

6. The shunting method for multi-network joint transmission claim 1, wherein the performing, by the network element of the 3GPP access network, data shunting transmission through a shunting connection between the network element of the 3GPP access network and the network element of the WLAN access network comprises:

transmitting, by the network element of the 3GPP access network, downlink shunted data to the network element of the WLAN access network through the shunting connection between the network element of the 3GPP access network and the network element of the WLAN access network so that the network element of the WLAN access network transmits the downlink shunted data to the UE; and receiving, by the network element of the 3GPP access network, uplink shunted data transmitted by the UE to the network element of the WLAN access network through the shunting connection between the network element of the 3GPP access network and the network element of the WLAN access network.

7. The shunting method for multi-network joint transmission according to claim 1, wherein when the 3GPP access network is a Long Term Evolution (LTE) network, the network element of the 3GPP access network is an evolved Node B (eNB), a Relay Node (RN) or a Home evolved Node B (HeNB); and when the 3GPP access network is a Universal Mobile Telecommunications System (UMTS) network, the network element of the 3GPP access network is a Radio Network Controller (RNC), a Node B or a Home Node B (HNB).

8. A shunting system for multi-network joint transmission, comprising a network element of a 3rd Generation Partnership Project (3GPP) access network, a network element of a Wireless Local Area Network (WLAN) access network and a User Equipment (UE), wherein the network element of the 3GPP access network is configured to transmit a shunting request message to the network element of the WLAN access network; upon receiving a success response from the network element of the WLAN access network, transmit to the UE a shunting command to indicate the UE to access a target WLAN access network corresponding to the network element of the WLAN access network; and after determining that the UE has successfully accessed the target WLAN access network, perform data shunting transmission through a shunting connection between the network element of the 3GPP access network and the network element of the WLAN access network;

the network element of the WLAN access network is configured to receive the shunting request message from the network element of the 3GPP access network and return a response to the network element of the 3GPP access network; and further configured to forward shunted data between the UE and the network element of the 3GPP access network through the shunting connection between the network element of the WLAN access network and the network element of the 3GPP access network; and the UE is configured to receive the shunting command from the network element of the 3GPP access network and access, according to the shunting command, the target WLAN access network corresponding to the network element of the WLAN access network; and further configured to, after accessing the target WLAN access network successfully, perform data shunting transmission through the network element of the WLAN access network and the network element of the 3GPP access network.

9. The shunting system for multi-network joint transmission according to claim 8, wherein the shunting request message comprises shunting configuration information that comprises identification information of the UE and further comprises at least one of following contents:

an address and a port number of the shunting connection of the network element of the 3GPP access network, and format information of a shunted data stream.

10. The shunting system for multi-network joint transmission according to claim 8, wherein the success response comprises shunting preparation information that comprises identification information of the UE and further comprises at least one of following contents:

a WLAN association identifier, address information allocated by the network element of the WLAN access network to the UE, and an address and a port number of the shunting connection of the network element of the WLAN access network.

11. The shunting system for multi-network joint transmission according to claim 8, wherein the shunting command comprises shunting indication information that comprises at least one of following contents:

a WLAN association identifier, address information allocated by the network element of the WLAN access network to the UE, and identification information of the WLAN access network.

12. The shunting system for multi-network joint transmission according to claim 8, wherein the network element of the 3GPP access network is configured to determine whether the UE has successfully accessed the target WLAN access network according to an indication message from the UE or the network element of the WLAN access network.

13. The shunting system for multi-network joint transmission according to claim 8, wherein the network element of the 3GPP access network is further configured to transmit downlink shunted data to the network element of the WLAN access network through the shunting connection between the network element of the 3GPP access network and the network element of the WLAN access network so that the network element of the WLAN access network transmits the downlink shunted data to the UE; and configured to receive uplink shunted data transmitted by the UE to the network element of the WLAN access network through the shunting connection between the network element of the 3GPP access network and the network element of the WLAN access network.

14. The shunting system for multi-network joint transmission according to claim 8, wherein when the 3GPP access network is a Long Term Evolution (LTE) network, the network element of the 3GPP access network is an evolved Node B (eNB), a Relay Node (RN) or a Home evolved Node B (HeNB); and when the 3GPP access network is a Universal Mobile Telecommunications System (UMTS) network, the network element of the 3GPP access network is a Radio Network Controller (RNC), a Node B or a Home Node B (HNB).

15. A network element of a 3rd Generation Partnership Project (3GPP) access network, comprising:
   a shunting request module configured to transmit a shunting request message to a network element of a Wireless Local Area Network (WLAN) access network and receive a response from the network element of the WLAN access network;
   a shunting indication module configured to, upon receiving a success response from the network element of the WLAN access network, transmit a shunting command to a User Equipment (UE) to indicate the UE to access a target WLAN access network corresponding to the network element of the WLAN access network; and
   a shunting transmission module configured to, after determining that the UE has successfully accessed the target WLAN access network, perform data shunting transmission through a shunting connection between the network element of the 3GPP access network and the network element of the WLAN access network.

16. The network element of the 3GPP access network according to claim 15, wherein the shunting request message comprises shunting configuration information that comprises identification information of the UE and further comprises at least one of following contents:
   an address and a port number of the shunting connection of the network element of the 3GPP access network, and format information of a shunted data stream.

17. The network element of the 3GPP access network according to claim 15, wherein the success response comprises shunting preparation information that comprises identification information of the UE and further comprises at least one of following contents:
   a WLAN association identifier, address information allocated by the network element of the WLAN access network to the UE, and an address and a port number of the shunting connection of the network element of the WLAN access network.

18. The network element of the 3GPP access network according to claim 15, wherein the shunting command comprises shunting indication information that comprises at leas one of following contents:
   a WLAN association identifier, address information allocated by the network element of the WLAN access network to the UE, and identification information of the WLAN access network.

19. The network element of the 3GPP access network according to claim 15, wherein the shunting transmission module is further configured to determine whether the UE has successfully accessed the target WLAN access network according to an indication message from the UE or the network element of the WLAN access network.

20. The network element of the 3GPP access network according to claim 15, wherein the shunting transmission module is further configured to transmit downlink shunted data to the network element of the WLAN access network through the shunting connection between the network element of the 3GPP access network and the network element of the WLAN access network so that the network element of the WLAN access network transmits the downlink shunted data to the UE; and configured to receive uplink shunted data transmitted by the UE to the network element of the WLAN access network through the shunting connection between the network element of the 3GPP access network and the network element of the WLAN access network.

21. The network element of the 3GPP access network according to claim 15, wherein
   when the 3GPP access network is a Long Term Evolution (LTE) network, the network element of the 3GPP access network is an evolved Node B (eNB), a Relay Node (RN) or a Home evolved Node B (HeNB); and
   when the 3GPP access network is a Universal Mobile Telecommunications System (UMTS) network, the network element of the 3GPP access network is a Radio Network Controller (RNC), a Node B or a Home Node B (HNB).

* * * * *